(12) United States Patent
Nicholls et al.

(10) Patent No.: US 12,704,649 B2
(45) Date of Patent: Aug. 11, 2026

(54) DOPPLER BASED CELLULAR NAVIGATION SYSTEM

(71) Applicant: Honeywell International Inc., Charlotte, NC (US)

(72) Inventors: James Alexander Nicholls, Glendale, AZ (US); Laurentiu Mihai Gheorghe, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 413 days.

(21) Appl. No.: 18/364,788

(22) Filed: Aug. 3, 2023

(65) Prior Publication Data

US 2025/0044462 A1 Feb. 6, 2025

(51) Int. Cl.
*G01S 5/10* (2006.01)
*G01S 19/42* (2010.01)
(Continued)

(52) U.S. Cl.
CPC .............. *G01S 19/48* (2013.01); *G01S 19/42* (2013.01); *G01C 21/165* (2013.01); *G01S 5/0246* (2020.05); *G01S 5/0263* (2013.01)

(58) Field of Classification Search
CPC ........ G01S 19/48; G01S 19/42; G01S 5/0246; G01S 5/02685; G01S 5/0263; G01S 5/0236; H04W 4/40; H04W 4/02
(Continued)

(56) References Cited

U.S. PATENT DOCUMENTS 5,414,432 A * 5/1995 Penny, Jr. ............... G01S 19/17 342/44
5,526,001 A * 6/1996 Rose ....................... G01S 3/023 342/450
(Continued)

FOREIGN PATENT DOCUMENTS

CN 100359560 C * 1/2008 ......... G01S 5/02695
CN 113419265 A 9/2021
(Continued)

OTHER PUBLICATIONS

Eason et al., "Locating Payloads Using Doppler Shift in the Signal of a Backup CW Beacon", SBA, Jun. 26, 2019, AHAC2019, No. 1, 1 of 3, pp. 1 through 6.
(Continued)

*Primary Examiner* — Chuong P Nguyen
(74) *Attorney, Agent, or Firm* — Fogg & Powers LLC

(57) ABSTRACT

A vehicle having a doppler based cellular navigation system is provided. The vehicle includes a radio frequency (RF) antenna, an RF receiver in communication with the RF antenna, a memory and a controller. The memory includes a ground-based RF emitter database with ground-based RF emitter location information. The controller is in communication with the RF receiver and the memory. The controller is configured to monitor a doppler shift in received RF signals from ground-based RF emitters. The controller is further configured to determine location information when the controller detects a doppler shift in a received RF signal of zero. The controller is further configured to implement the determined location information in navigating a vehicle.

20 Claims, 9 Drawing Sheets

(51) Int. Cl.
*G01S 19/48* (2010.01)
*G01C 21/16* (2006.01)
*G01S 5/02* (2010.01)

(58) Field of Classification Search
USPC ................ 342/357.78, 464, 3, 57.25, 357.31
See application file for complete search history.

(56) References Cited

U.S. PATENT DOCUMENTS 5,572,427 A 11/1996 Link et al.
8,831,626 B2 9/2014 Hyun et al.
9,007,262 B1 * 4/2015 Witzgall ............... G01S 5/0246 342/357.78
9,128,173 B1 9/2015 Witzgall
10,267,895 B1 * 4/2019 Naething ................ G01S 13/86
10,871,576 B2 * 12/2020 Nirula ..................... G01S 19/40
11,573,085 B2 2/2023 Tegerdine et al.
2002/0097184 A1 7/2002 Mayersak
2019/0072634 A1 * 3/2019 Johnson .................... G01S 1/38
2019/0124617 A1 * 4/2019 Jones .................. H04W 64/003
2019/0346270 A1 * 11/2019 Parodi ................... G01S 5/0226
2021/0026022 A1 1/2021 Kennedy et al.
2023/0058234 A1 * 2/2023 Kleder ...................... G01S 1/08

FOREIGN PATENT DOCUMENTS

EP 1976152 A1 10/2008
JP 7240127 B2 * 3/2023 ........... G01S 5/0273

OTHER PUBLICATIONS

Halili et al., "Vehicle Localization Using Doppler Shift and Time of Arrival Measurements in a Tunnel Environment", Sensors, Jan. 22, 2022, vol. 22, No. 847, pp. 1 through 20.
Johnny, "How to find the Cell Id location with MCC, MNC, LAC and CellID (CID).", Apr. 22, 2015, as downloaded Apr. 19, 2023 from https://cellidfinder.com/articles/how-to-find-cellid-location-with-mcc-mnc-lac-i-cellid-cid, pp. 1 through 10.
Millman National Land Services, "What is a Cell Tower and How Does a Cell Tower Work?", May 12, 2020, as downloaded Apr. 19, 2023 from https://millmanland.com/company-news/what-is-a-cell-tower-and-how-does-a-cell-tower-work/, pp. 1 through 9.
European Patent Office, "Extended European Search Report", dated Jan. 8, 2025, from EP Application No. 24187659.8, from Foreign Counterpart to U.S. Appl. No. 18/364,788, pp. 1 through 10, Published: EP.

* cited by examiner

DOPPLER BASED CELLULAR NAVIGATION SYSTEM

BACKGROUND

A type of navigation system currently being used is a global navigation satellite system (GNSS). A GNSS determines location information with use of satellite signals sent from a plurality of satellites that are received at a receiver of a vehicle. From each satellite signal, a range is determined to the satellite that sent the signal. One common way to determine the range is by sending clock and satellite location information in an associated signal. With a plurality of range determinations, a location system of the vehicle can determine the location of the vehicle. A GNSS typically provides world-wide high precision position and time information. There are however some limitations of the current GNSS. These limitations include multipath signals, particularly when operating in urban environments, sunspot and solar flares that may potentially interfere with satellite signals or even damage satellites, jamming/spoofing of satellite signals, intentional degradation or obfuscation, and satellite failures which may result in intermittent coverage while spare satellites are re-positioned. Hence it is desired to have another navigation system available when a GNSS is compromised.

Another common type of navigation system used is an inertial navigation system (INS). An INS provides relative measurements given an initial reference. The relative measurements may be used to determine location, orientation, and velocity information. The relative measurements, however, are subject to drift errors over time. Hence, it is desired to have a supplemental system that can correct drift errors in the relative measurements for an INS.

For the reasons stated above and for other reasons stated below which will become apparent to those skilled in the art upon reading and understanding the present specification, there is a need in the art for an effective and efficient navigation system that can supplement another type of navigation system when needed.

SUMMARY

The following summary is made by way of example and not by way of limitation. It is merely provided to aid the reader in understanding some of the aspects of the subject matter described. Embodiments provide a Doppler based cellular navigation system to generate location information. The location information may be used for navigation of a vehicle. Further in an example, the location information from the Doppler based cellular navigation system may be used when location information from other navigation systems is not available or be used to supplement location information from the other navigation systems.

In one embodiment, a vehicle having a Doppler based cellular navigation system is provided. The vehicle includes a radio frequency (RF) antenna, an RF receiver in communication with the RF antenna, a memory, and a controller. The memory includes a ground-based RF emitter database with ground-based RF emitter location information. The controller is in communication with the RF receiver and the memory.

The controller is configured to monitor a Doppler shift in received RF signals from ground-based RF emitters. The controller is further configured to determine location information when the controller detects a Doppler shift in the received RF signal of zero. The controller is further is also configured to implement the determined location information in navigating the vehicle.

In another embodiment, a method of determining the location of a vehicle with a Doppler based cellular navigation system is provided. The method including identifying a ground-based radio frequency (RF) emitter in a travel path of vehicle using a ground-based radio RF emitter database; monitoring a Doppler shift in a received signal from the identified ground-based RF emitter as the vehicle continues in the travel path; determining a vehicle closest position to the ground-based RF emitter when the Doppler shift reaches zero; and determining the location of the vehicle based at least in part on the determined closest position to the ground-based RF emitter.

In still another embodiment, a method of determining a location of a vehicle with a Doppler based cellular navigation system, the method including, monitoring for radio frequency (RF) signals with an RF receiver; identifying a discreate frequency band used by a detected RF signal; identifying a ground-based RF emitter based on an identified discrete frequency band; obtaining ground-based RF emitter information regarding the identified ground-based RF emitter from a ground-based RF emitter database; monitoring Doppler shift in the detected RF signal; and determining location information of the vehicle at least in relation to the identified ground-based RF emitter based on at least the obtained ground-based RF emitter information and when the monitored Doppler shift reaches zero.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
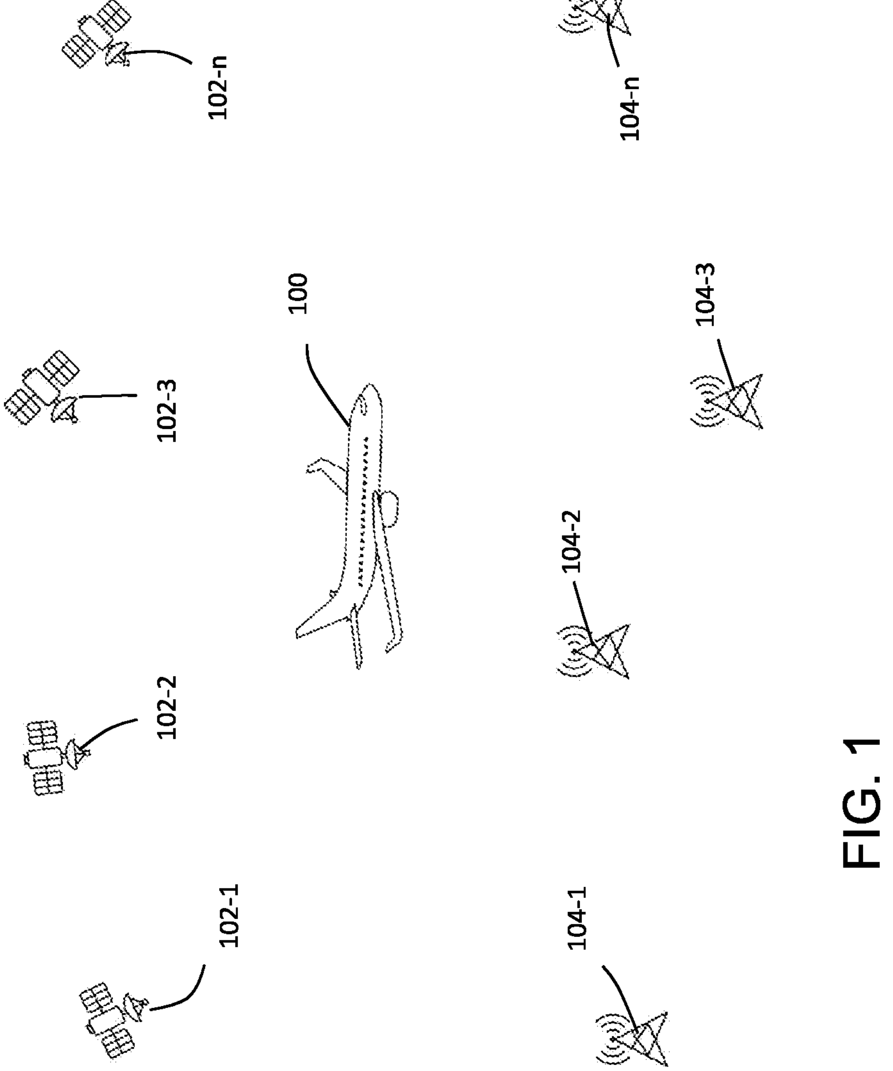
FIG. 1 is an illustration of a vehicle with a Doppler cellular navigation system that is traversing along a travel path that includes satellite and cellular coverage areas according to one exemplary aspect.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a Doppler based cellular navigation system. A vehicle may use the Doppler based navigation system on its own for location information, when location information is unavailable from other navigation systems, or to supplement location information of other navigation systems. The Doppler based cellular navigation system is not subject to being inhibited by the disabling of another navigation system such as a GNSS. Further embodiments provide a Doppler based cellular navigation system that is not limited by a number of users, that may be used as a backup, requires a minimal amount of dedicated infrastructure (the ground infrastructure is already available), and is operatable in all weather conditions.

Wireless signals, such a radio frequency (RF) signals used in cellular communication networks, emanate from a point source that decays with an inverse square when looking at the signal in the far field. Near field antenna design can provide significant signal gain in relation to a dipole (omni directional antenna). In applications such as mobile base stations that include ground-based RF emitters, antenna designs may be more directional, this is one reason why ground-based RF emitters include antennas arranged in a circular array. The antennas used on ground-based RF emitters may have an emission range of 120 degrees (or less with for example 15 antennas per tower) depending on design and performance characteristics. Additionally, these antennas may be angled such that a certain percentage of the emitted energy does not go above the horizontal plane at which the antenna is mounted (most cellular mobile users are on the ground and below the local antenna plane). Fortunately, due to diffraction, reflection of signals, and antenna emission characteristics, portions of the signal reach above the horizontal plane, and up to large distances. For example, they may reach 45 miles or more. While a maximum range may theoretically be 45 miles in general practices, the range may be reduced to minimize interference with other nearby towers. The propagation of mobile technology worldwide provides a potential useful technology data source. Examples of useful information that may be obtained from mobile technology by monitoring the RF signals include, but is not limited to, aircraft airspeed, signal strength, cellular band channels, and the location of fixed ground-based RF emitters.

Figure 2:
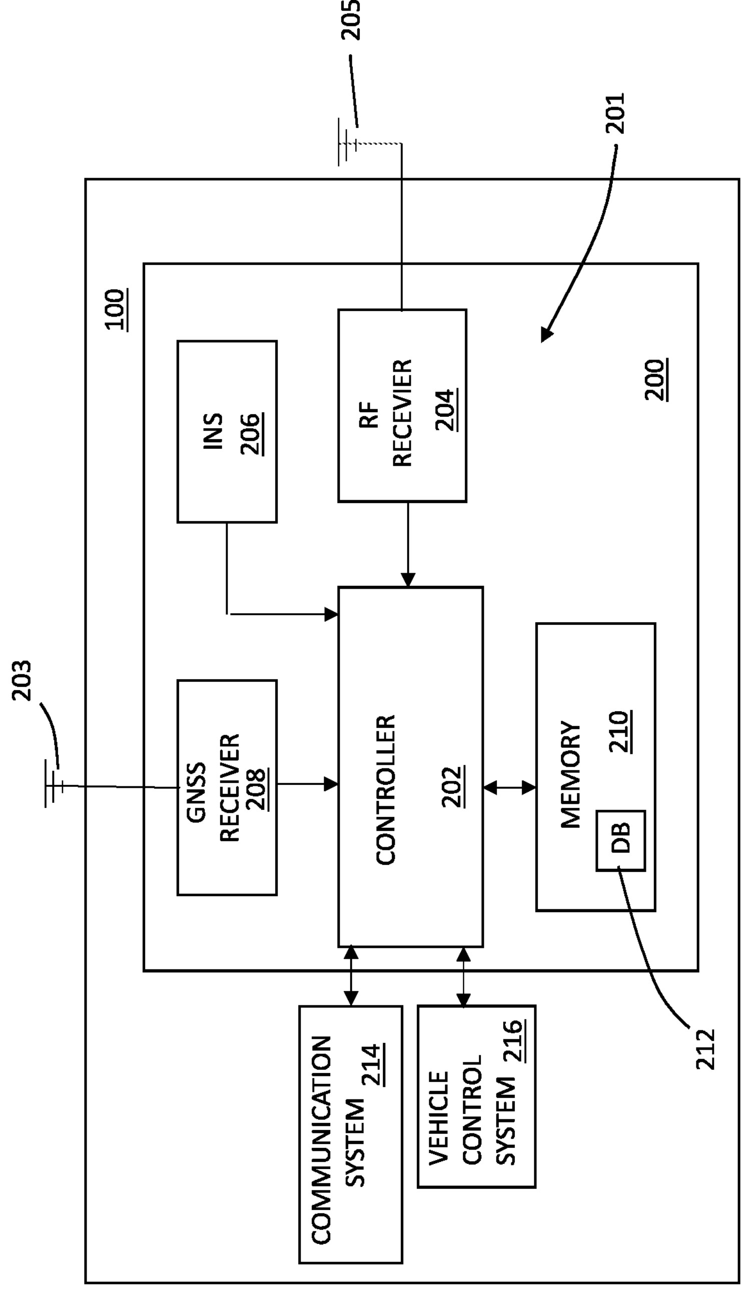
FIG. 2 is a block diagram of a vehicle including a location determining system according to one exemplary aspect.

Referring to FIG. 1, a vehicle 100 (which is an aircraft in this example) that is configured to determine navigation information including vehicle location based at least in part on satellite signals from satellites 102-1 through **102-*n* and radio frequency (RF) signals radiated from antennas on ground-based RF emitters 104-1 through 104-*n* is illustrated. The ground-based RF emitters 104-1 through 104-*n* may be mounted on cellular towers or attached to other fixed locations. FIG. 2 illustrates a block diagram of components of vehicle 100 that at least in part includes a location determining system 200 used to determine location information for navigation. In this example, the location system 200 of the vehicle includes a controller 202 and memory 210**.

In general, the controller 202 may include any one or more of a processor, microprocessor, a digital signal processor (DSP), an application specific integrated circuit (ASIC), a field program gate array (FPGA), or equivalent discrete or integrated logic circuitry. In some example embodiments, controller 202 may include multiple components, such as any combination of one or more microprocessors, one or more controllers, one or more DSPs, one or more ASICs, one or more FPGAs, as well as other discrete or integrated logic circuitry. The functions attributed to controller 202 herein may be embodied as software, firmware, hardware or any combination thereof. Controller 202 may be part of a system controller or a component controller. Memory 210 may include computer-readable operating instructions that, when executed by the controller 202 provide location functions. Such location functions may include the functions of Doppler based cellular navigation system 201 described below. The computer readable instructions may be encoded within memory 210. Memory 210 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

The location determining system 200 of the vehicle further includes a global navigation satellite system (GNSS) receiver 208 and an associated GNSS antenna 203, an inertial navigation system (INS) 206 and an RF receiver 204 with an associated RF antenna 205. The GNSS receiver is configured to receive satellite signals from the satellites 102-1 through **102-*n* through the GNSS antenna 203 and determine range information to each associated satellite 102-1 through 102-*n*. The range information is used to determine location information of vehicle 100. Controller 202 is in communication with the GNSS receiver 208**.

The INS 206 is also in communication with controller 202. The INS 206 provides relative measurements given an initial reference. The relevant measurements may be used by controller 202 to determine location, orientation, and velocity of the vehicle 100. These relative measurements, however, can accumulate drift errors over time.

The Doppler based cellular navigation system 201 includes at least the RF receiver 204, the controller 202 and the memory 210. In other examples the Doppler based cellular navigation system 201 includes all the components in the location determining system 200. The RF receiver 204 is further in communication with controller 202. The RF receiver 204 receives RF signals from the ground-based RF emitters 104-1 through **104-*n* through RF antenna 205 and communicates the received RF signals to the controller 202. If the RF receiver 204 has enough sensitivity, a frequency offset (i.e., Doppler shift) can be detected. As discussed below in detail, controller 202** uses the Doppler shift in determining location information.

Memory 210 may include a ground-based RF emitter database 212. The ground-based RF emitter database 212 may include identification and location information relating to ground-based RF emitters 104-1 through **104-*n*. Controller 202 uses the identification and location information of ground-based RF emitters 104-1 through 104-*n* in determining location information of vehicle 100. In one embodiment, the controller 202 is configured to add ground-based RF emitter information not already in the ground-based RF emitter database 212, when detected, which than may be communicated to a remote location that compiles the ground-based RF emitter database 212 and distributes the ground-based RF emitter database 212** to other vehicles.

Controller 202 of location determining system 200 is further in communication, in this example, with a communication system 214 and a vehicle control system 216. The communication system 214 may be used to communicate determined location information of the vehicle 100 and detected ground-based RF emitters 104-1 through **104-*n* to a remote location. The vehicle control system 216 is used to control, at least in part, operations of the vehicle 100 including direction of travel in one example. Further, in one example, controller 202, based at least in part determined location information, controls operations of the vehicle control system 216**.

In one example, controller 202 uses location information derived from signals from ground-based RF emitters 104-1 through **104-*n* when satellite signals from satellites 102-1 through 102-*n* are not available (in non-satellite signal coverage period) or are inaccurate for navigation. In other embodiments, controller 202 supplements location information determined with one of the satellite signals and inertial signals from the INS 206 with location information determined by received RF signals from the ground-based RF emitters 104-1 through 104-*n*. In yet another embodiment, signals from ground-based RF emitters 104-1 through 104-*n* are used to determine location information of a vehicle 100. The Doppler based cellular navigation system 201** described herein may be applied to any type of moving vehicle including, but not limited to, any type of aircraft including drones and any land and water-based vehicles.

The use of RF signals from ground-based RF emitters 104-1 through **104-*n* to find location information is further described in view of FIGS. 3A through 8. The measurement of signal strength (RSSI) of the RF signals can provide a relative distance measurement to a ground-based RF emitter. Hence, a vehicle 100** detecting an RF signal that was generated by a transmitter and transmitted through an antenna at the ground-based RF emitter could determine a relative distance to the ground-based RF emitter.

Embodiments of the RF receiver 204 monitor for RF signals used in cellular wireless bands used for example in global system for mobile communication (GSM), code division multiple access (CDMA) and long-term evolution (LTE) wireless technologies. As the relative distance to the ground-based RF emitters (generally referenced by 104) decreases, the measured signal strength increases. This is illustrated in power verse distance graph 300 of FIG. 3A. As the vehicle 100 moves closer to a ground-based RF emitters 104 the signal power 302 increases till it reaches its maximum power strength (which is the closest distance 303 the vehicle comes to the ground-based RF emitter 104. As vehicle 100 moves away from ground-based RF emitter 104, the signal strength weakens as also illustrated in the power verse distance graph 300 of FIG. 3A.

Figure 3A:
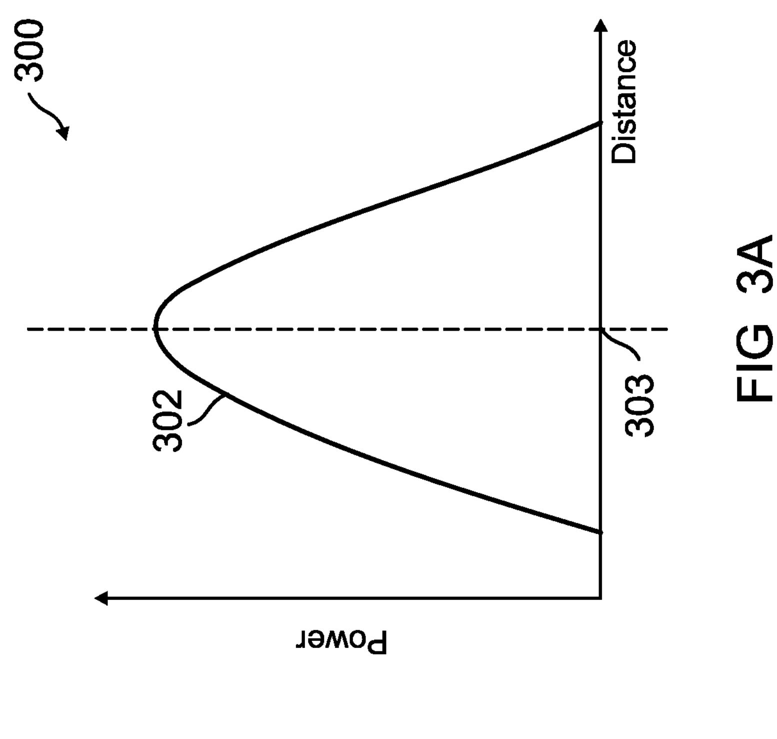
FIG. 3A is a power verses distance graph of a radio frequency signal used in cellular communications.
Figure 3B:
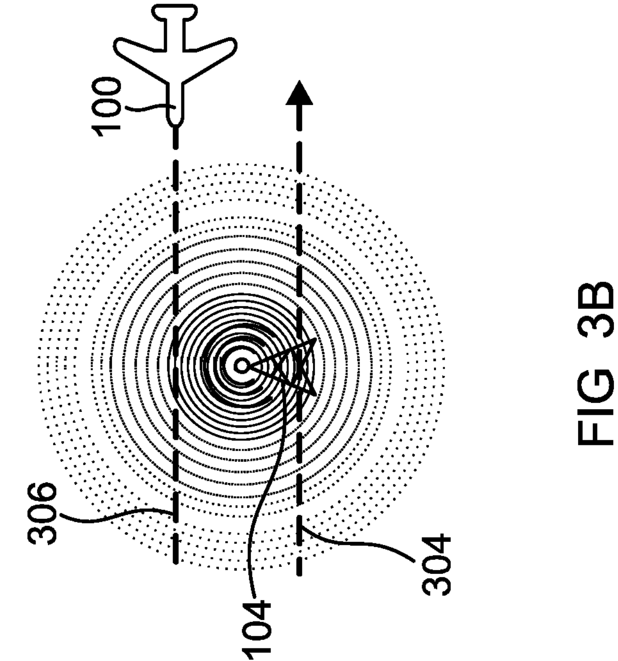
FIG. 3B illustrates two different vehicle travel paths that would provide a similar power verses distance result in the power verses distance graph of FIG. 3A.

Distance information to a ground-based RF emitter derived by the detecting signal strength, however, is generally not enough information to discern any useful position information. For example, as illustrated in FIG. 3B, from just strength information you cannot discern between different vehicle paths 304 and 306 in relation to the ground-based RF emitter 104 since they will both provide similar signal strength readings. Further, the distance information is only relevant to the specific ground-based RF emitter transmitting the RF signals. Additionally, different ground-based RF emitters may have different power outputs, so the distance may scale at a different rate depending on the RF signals from different ground-based RF emitters.

Figure 4:
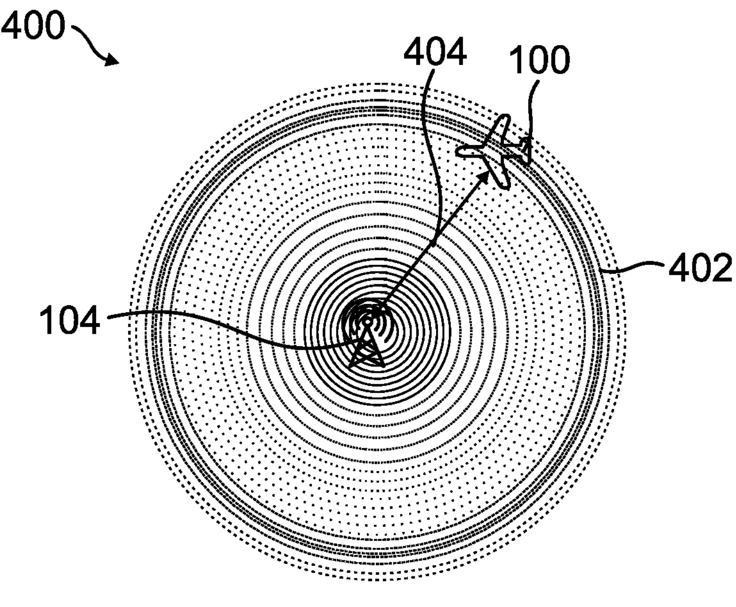
FIG. 4 illustrates a vehicle traveling within an emissive region (coverage area) provided by a ground-based RF emitter.

Referring to FIG. 4, signal strength may provide a probability region 402 within an emissive region 400 (coverage area) of the ground-based RF emitter 104. Although probability region 402 provides a data point, the data point is not enough to conclusively locate the aircraft or other vehicle relative to ground-based RF emitter 104. The data point, however, may function similarly to an automatic direction finder (ADF) antenna found on certain legacy aircraft and it's use for navigational purposes. The signal strength measurement essentially provides a slant distance to the ground-based RF emitter which may be on a radio tower. This provides one useful value for determining relative distance to the ground-based RF emitter.

Embodiments use Doppler shift in receiver RF signals from ground-based RF emitters 104 in determining location information. A Doppler shift is a change in an observed frequency of a signal when movement of one of a source of the signal or an observer of the signal relative to the other of the source or observer occurs. Generally, signals waves emitted by a source that travel towards the observer are observed as compressed as the observer approaches the source causing an observed increase in frequency while signals waves observed by the observer traveling away from the source of the signal are observed as being elongated causing an observed decrease in frequency.

The measurement of the Doppler shift is critical to a relatively moving target, as the Doppler shift is proportional to the angle and rate at which a target is moving towards. The Doppler shift is provided by the following formula $f_d=(2v\cos\theta/\lambda)$. Hence, the Doppler shift $f_d$ is equal to two times the velocity v of the object (vehicle) moving times the objects relative approach angle to the emitter of the signal divided by the frequency $\lambda$ of the emitted signal. Hence, the Doppler shift changes based on the relative approach angle to the emitter (transmitter).

Figure 5B:
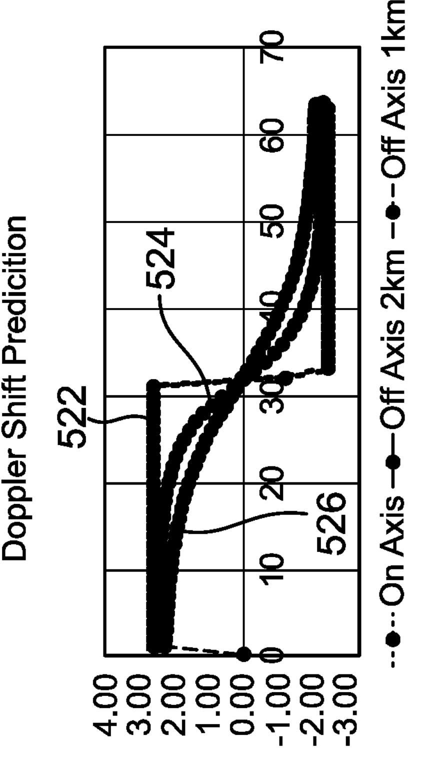
FIG. 5B illustrates a Doppler shift prediction graph relating to the three potential travel paths in relation to the ground-based RF emitter of FIG. 5A.
Figure 5A:
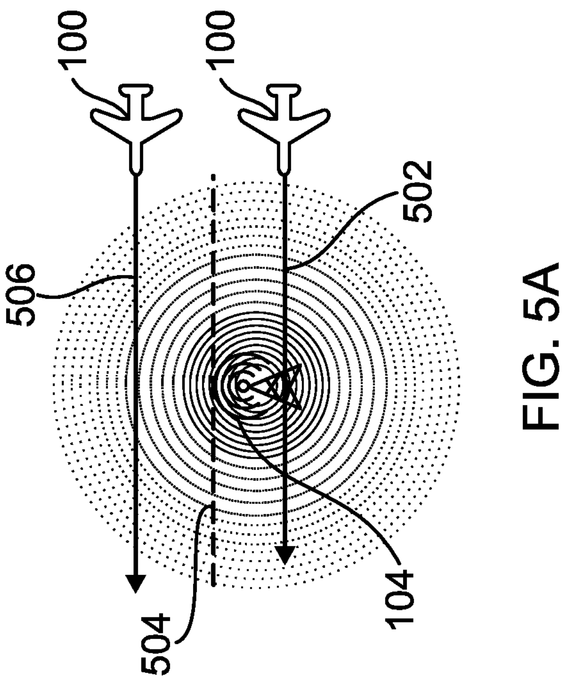
FIG. 5A illustrates three potential travel paths of a vehicle in relation to a ground-based RF emitter.

FIG. 5A illustrates a first travel path 502 of vehicle 100, a second travel path 504 of the vehicle 100 and a third travel path 506 of vehicle 100 relative to a ground-based RF emitter 104. FIG. 5B illustrates calculated Doppler shifts associated with the first travel path 502, the second travel path 504 and the third travel path 506. The first travel path 502 is on axis with the ground-based RF emitter 104 and results in a first Doppler shift prediction 522 illustrated in FIG. 5B. The second travel path 504 is off axis by 1 Km and provides a second Doppler shift prediction 524 and the third travel path 506 is off axis by 2 Km in this example and results in a third Doppler shift 526. As illustrated in FIGS. 5A and 5B, when the reference frame (travel path of vehicle 100) is traveling off-axis, the Doppler shift changes. As the off-axis distance to the receiver varies the perceived Doppler shift smooths out the further away and "squeezes" together the closer.

Velocity used in determinations in examples are capable of providing north/south (N/S) and east/west (E/W) velocity vectors. For example, in an avionic application an inertial reference system (IRS) and/or flight management system (FMS) may be used to provide velocity vectors. The velocity vectors can be combined using simple arithmetic.

Embodiments use cellular ground stations to locate a position of a vehicle. The cellular ground stations are generally referred to herein as ground-based RF emitters 104 that include one or more antennas to radiate RF signals. Several different methods may be used in examples to determine position using the radiated RF signals. The methods require movement of the vehicle relative to the ground-based RF emitter 104. The first method involves using a single ground-based RF emitter and determining a line of position using the frequency and measuring distance to the ground-based RF emitter using the rate of change of the Doppler shift. This option is a simpler implementation but provides only intermittent updates with inertial navigation being used in between updates. The second example uses multiple ground-based RF emitters 104. In this example, range and/or bearing to the ground-based RF emitter is determined and use intersections of the range and/or bearing is used to determine vehicle position. The multiple ground-based RF emitter 104 example provides more frequent updates but would result in a more complex receiver that has the ability to monitor multiple frequencies simultaneously from different ground-based RF emitters.

In the first example with the use of one ground-based RF emitter, as the vehicle 100 travels past a ground-based RF emitter 104, due to the Doppler effect the received frequency at the vehicle 100 will transition from being greater than the transmitted frequency at the ground-based RF emitter 104 to less than the transmitted frequency at the ground-based RF emitter. Given a reasonably accurate ground track from an aircraft inertial system or even a heading, the ground-based RF emitter position relative to the aircraft, in an avionic example, will be at a position perpendicular to the travel path of the vehicle at the time the received frequency at the vehicle 100 equals the transmit frequency from the ground-based RF emitter 104 (zero Doppler shift at this point). At this perpendicular point, vehicle 100 is at the closest to the ground-based RF emitter 104 that is emitting the RF signals. The rate of change of the received frequency as the vehicle passes the ground-based RF emitter 104 will be proportional to the distance from the ground-based RF emitter. This isolates the possible positions to two locations, one on either side of the ground station. Inertial information from an inertial system, such as INS 206 discussed above, can then be used to determine which of these is correct. Because this method only obtains position updates as a ground-based RF emitter is passed, the inertial system would need to be used to provide navigation in between the position updates. The distance measurement would be a slant distance including not only lateral displacement but also altitude of the aircraft in an avionic example. Theoretical distance estimate accuracy could be on the order of around 10 wavelengths. At cellular frequencies this would be on the order of around 10 feet.

Figure 6B:
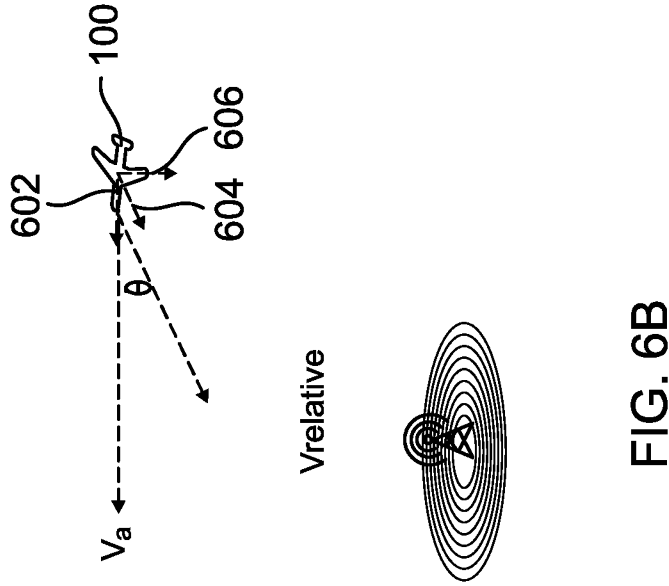
FIG. 6B illustrates the vehicle angle to the ground-based RF emitter applied in 3D space.
Figure 6A:
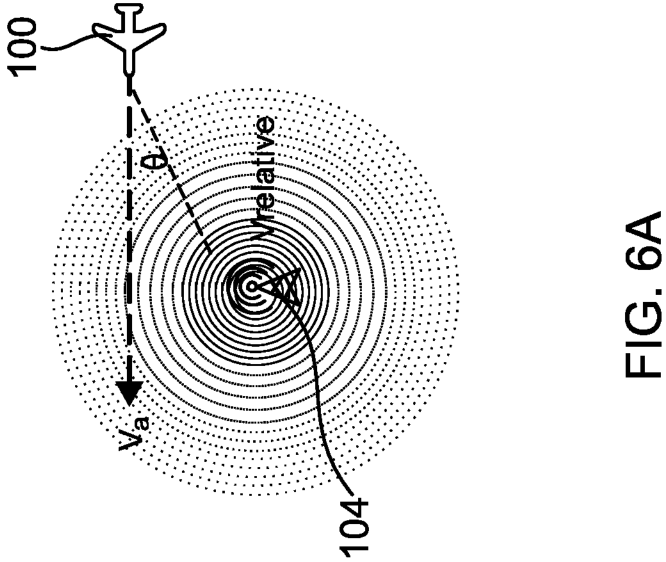
FIG. 6A illustrates a vehicle angle to a ground-based RF emitter.

Since the Doppler shift is proportional to the relative velocity and angle to the ground-based RF emitter 104 (base station), it is possible to derive or infer the vehicles relative angle θ to the ground-based RF emitter 104 as illustrated in FIG. 6A. This may be done with the knowledge of the expected frequency band and channel in the RF signals which are being received. According to the International Telecommunication Union (ITU) and European Telecommunication Standards Institute (ETSI), channels must operate at fixed frequencies. With known airspeed $V_a$ of the aircraft in an avionic example, the relative angle θ can be determined with the following resultant base formula:

$$\text{acos}\left(f_d * \frac{\lambda}{2V_a}\right) = \theta$$

The above application of a Doppler shift is discussed in a two-dimensional (2D) plane as illustrated in FIG. 6A. A determination of the Doppler shift in 2D may have applications for vehicles at low vertical separation relative to a ground-based RF emitter 104 or traversing terrain. However, for aircraft flying at significantly high altitudes relative to a ground-based RF emitter 104, Doppler shift analysis may be applied in a three-dimensional (3D) space. Application in 3D is illustrated in FIG. 6B. When applying in 3D space additional considerations need to be taken into consideration such as horizontal plane of the velocity vector components 602 and 604 are driven by the inertial system. To get a true velocity in 3D space, a combination of the NS, EW as well as vertical velocity components 606 need to be combined. This information may already be available for use in the avionic systems of the aircraft. The information may be gathered from digital data communications between avionic systems from a bus using communication standards such as Aeronautical Radio Incorporated (ARINC) 429. The resultant base formula from 2D space can still be applied but now the angle provided, theta (0), is at a "slant" angle and as such needs to be resolved.

The RF receiver 204 in an embodiment, is designed to receive a wideband of applicable signals. In one example controller 202, based on operating instructions stored in memory 210, uses the RF receiver 204 to track and monitor specific channels. Channels that are in similar signal strength modes can be considered co-located and on the same ground-based RF emitter. Controller 202, in one example, is configured based on the operating instructions to determine the best three available non-collocated signals. The approximate locations of ground-based RF emitters are known and identifiable. In one example, this is with the use of the information in ground-based RF emitter database 212. Ground-based RF emitter database 212 may include identification and location information relating to the ground-based RF emitters 104-1 through **104-*n*. Identification of a ground-based RF emitter 104** may be made from the frequency band it broadcasts its RF signals.

Figure 7:
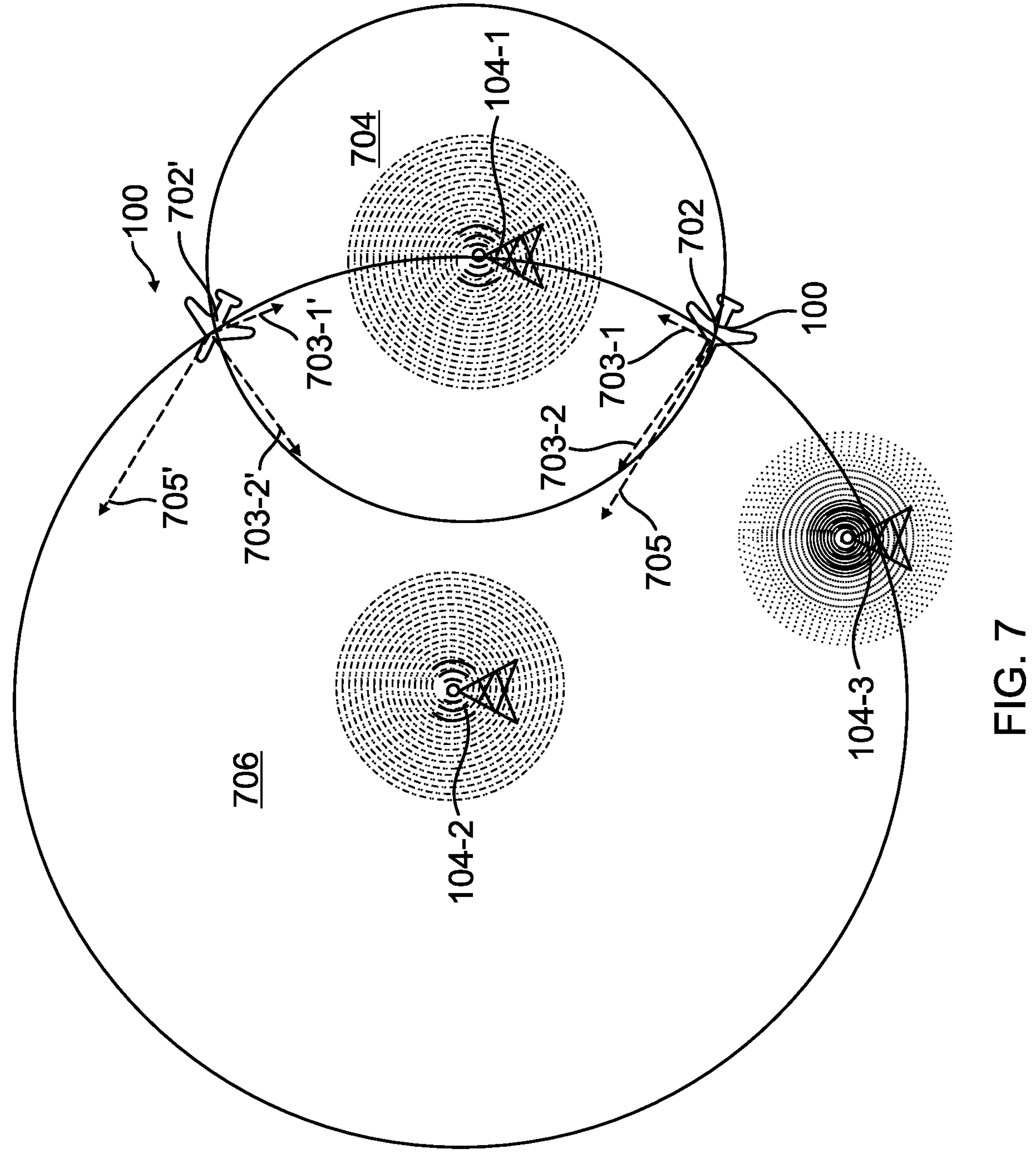
FIG. 7 illustrates identifying possible locations of a vehicles using RF signals from ground-based RF emitters.
Figure 8:
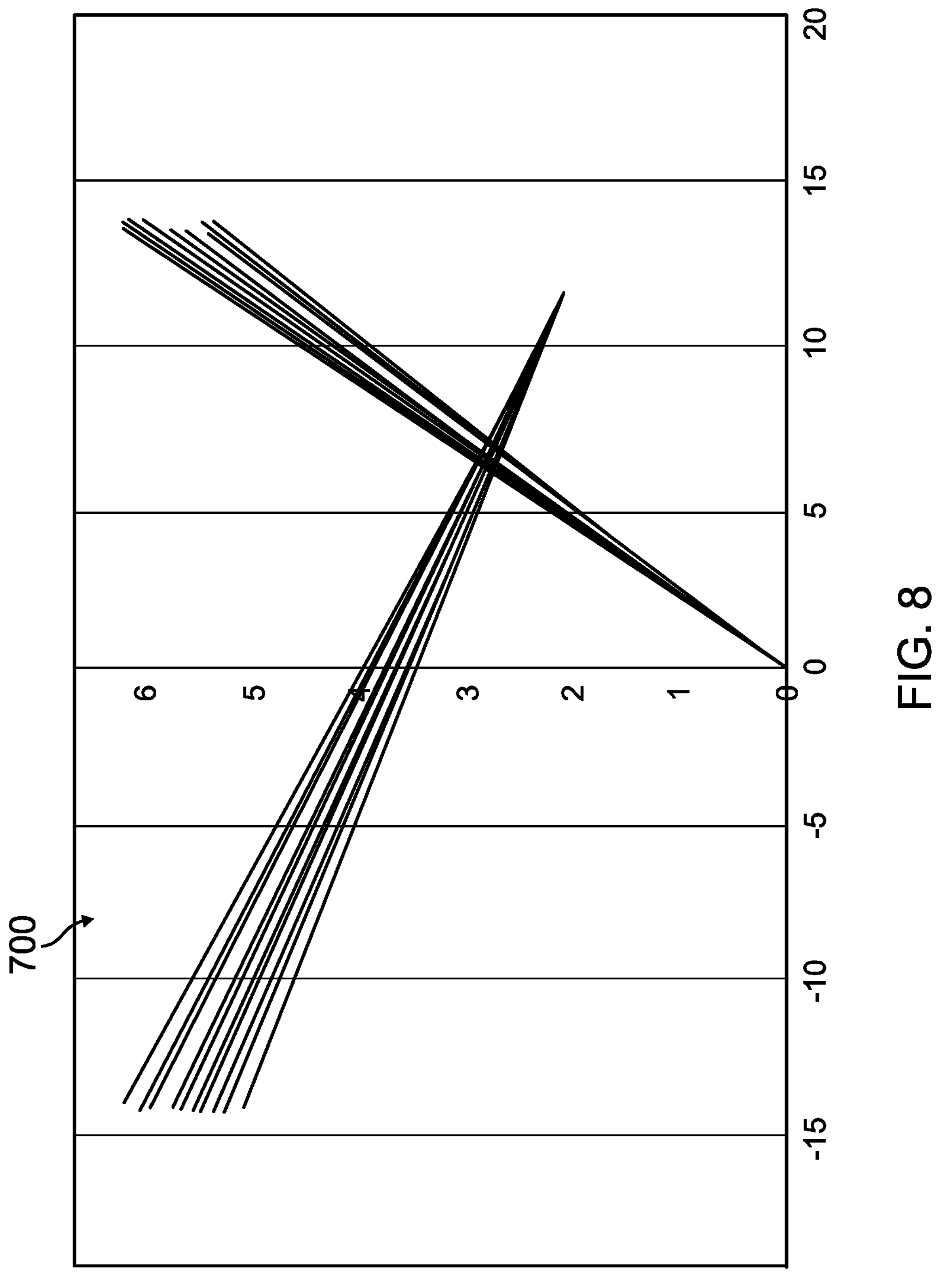
FIG. 8 illustrates an angular distance plot used to calculate angular distance relative to a ground-based RF emitter according to one exemplary aspect.

The location of vehicle 100 may be determined trigonometrically by controller 202 in one example. Further with the additional knowledge of Doppler shift, the location can be determined using only two known ground-based RF emitters 104. An example of this is shown in FIG. 7. FIG. 7 illustrates two possible locations of vehicle 100 at locations 702 and 702' at the intersections of signal coverage area 704 of ground-based RF emitter 104-1 and signal coverage area 706 of ground-based RF emitter 104-2 at known signal strengths using trigonometry. To determine correct location 702 or 702', embodiments use a Doppler shift analysis as discussed above. At location 702, the closest distance to ground-based RF emitter 104-1 is indicated by first direction indicator 703-1 and the closest distance to ground-based RF emitter 104-2 is indicated by second direction indicator 703-2. The closest distance of vehicle 100 to the ground-based RF emitter indicates the direction the RF signals radiated from an antenna of the ground-based RF emitter is traveling to reach an antenna of the vehicle 100. Further illustrated is the direction of travel of vehicle 100 by a first vector 705. As illustrated, the vehicle 100, in location 702, is headed towards the second ground-based RF emitter 104-2 close to the direction of the first vector 705 the RF receiver 204 will be measuring an accelerated frequency from the RF signals from the second ground-based RF emitter 104-2 at this point. Further RF receiver 204 of the vehicle 100 at location 702 is at its closest point to ground-based RF emitter 104-1. At this point, the Doppler shift will be transiting from an accelerated frequency to a slowed frequency in relation to the RF signals transmitted from the first ground-based RF emitter 104-1.

The vehicle 100 in position 702' has not reached its closet point to the second ground-based RF emitter 104-2 so the RF receiver 204 with be measuring an accelerated frequency from the RF signal generated by the second ground-based RF emitter 104-2 at his point. Further RF receiver 204 of the vehicle 100 at location 702' has gone past its closest point to ground-based RF emitter 104-1 at this point. The Doppler shift will be measured at a slower frequency at the RF receiver 204 from the RF signals transmitted from the first ground-based RF emitter 104-1 at this point. From the Doppler shift information, controller 102 is able to determine which location 702 or 702' the vehicle is actually located.

In an embodiment, the position determining is repeated with two known ground-based RF emitters to create a table of derived positions of the vehicle 100. In another embodiment, the location of determined ground-based RF emitters are gathered and stored in database 212 that can be disseminated to other vehicles.

For general positioning determining in an avionic application determining a relative distance to a ground-based RF emitter as well as a relative bearing is used. With these values it is possible to derive the relative position of the aircraft. In one example, the calculated distance is converted to a horizontal distance. This may be done using an approximated position of the cell tower, a known ground elevation (from database 212) associated with the ground-based RF emitter 104, and altitude information of the vehicle 100. A vertical component can be calculated with this information and with the vertical component a horizontal component can be determined. Thus, the computational distance to the ground-based RF emitter 104 will result in distance and bearing from the ground-based RF emitter 104 to the vehicle 100. In addition, a relative vertical angle from the ground-based RF emitter 104 to the vehicle 100 can be used, in an avionic application, in the event the aircraft is not flying straight and level and there is a horizontal and vertical component to the Doppler shift to provide the horizontal bearing.

As discussed above, the use of RF cellular communication signals from cellular base stations is used because ground-based RF emitters operate at discreate frequency bands with multiple discrete channels per band. Examples of bands include 698-806 MHz (700 MHz Band), 806-849/851-896 MHz (800 MHz Band), 1850-1910/1930-1990 MHz (PCS Band), 1710-1755/2110-2155 MHz (AWS Band). Across these bands, channels can operate in different bandwidths depending on signal-to noise ratio (SNR) from a mobile device to a base station of a cellular network provider. For example, in the 700 MHz band may include channels 12 and 13. In this example, the effective Doppler shift in this frequency range is on the order of 652 Hz. With an RF receiver, such as a software defined radio (SDR) receiver, it is feasible to be able to track and collect enough data points to be able to discern individual channels and their respective Doppler shift.

With the Doppler shift being minimal relative to the observed frequency range, it may be necessary to collect a significant amount of data and perform an appropriate statistical model to provide relatively accurate positional data. For example, calculated angular distance relative to a ground-based RF emitter may implemented with an angular distance plot 800 illustrated in FIG. 8. The angular distance plot 800 provides certain position uncertainty information, but with enough data, the expected distribution of angles is gaussian. One example utilizes a +/−1 sigma value for distribution. The more data points used the better the measured accuracy.

Figure 9:
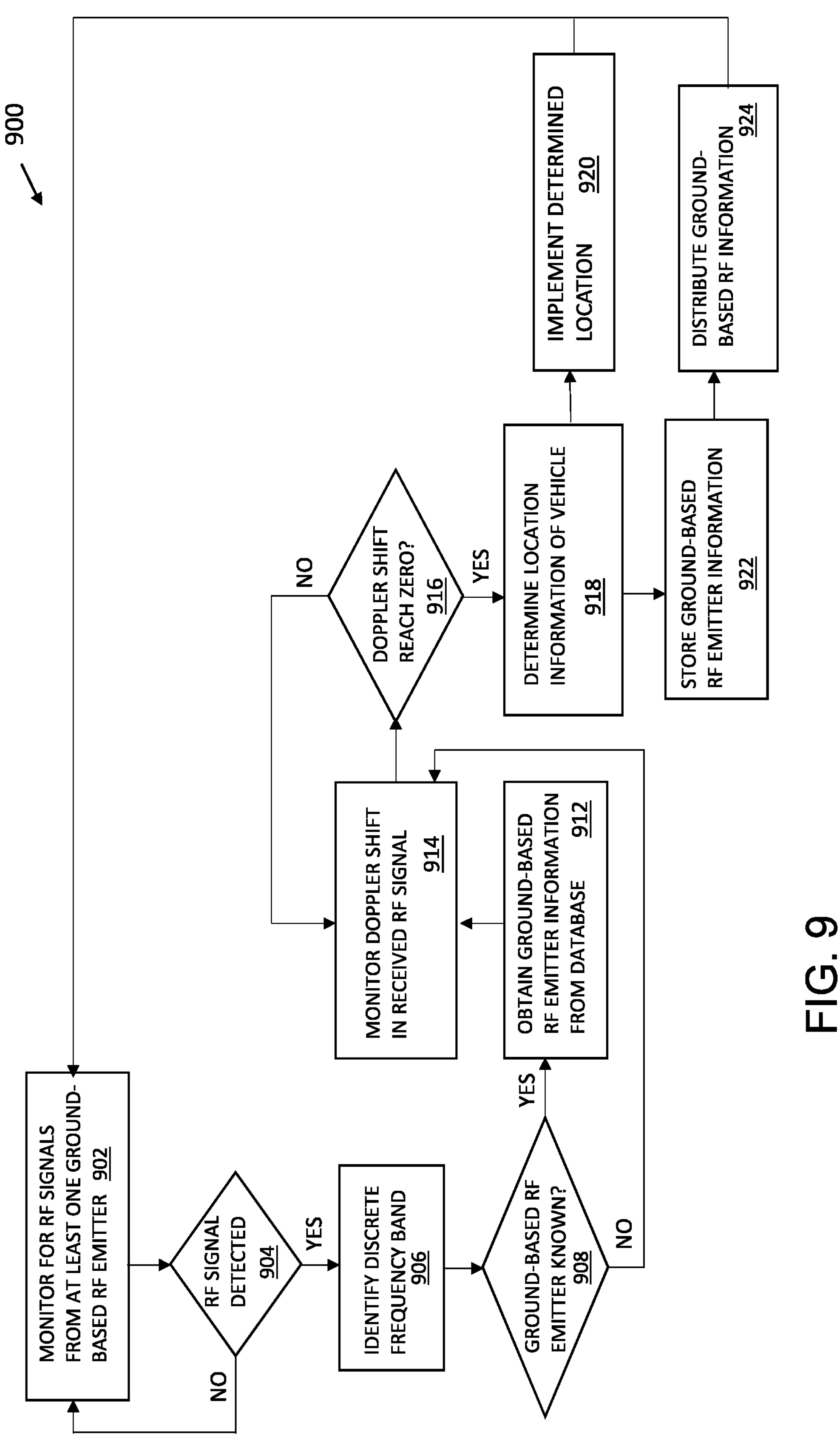
FIG. 9 is a flow diagram illustrating a method of using Doppler shift to determine location information according to one exemplary aspect.

Referring to FIG. 9, a method of using Doppler shift to determine location information is illustrated in flow diagram 900. Flow diagram 900 is provided in a sequential series of blocks. The sequence, however, may occur in a different order or even in parallel in other examples. Hence, the present invention is not limited to the sequence of blocks set out in flow diagram 900.

At block 902 the vehicle 100 monitors for RF signals that are emitted from ground-based RF emitters. In an example, the controller 202 monitors for the RF signals that are detected by the RF receiver 204. Further in one example the nearest ground-based RF emitter is monitored. It is determined at block 904 if an RF signal has been detected. If an RF signal is not detected at block 904, the process continues at block 902 monitoring for RF signals. If an RF signal is detected at block 904, a discrete frequency band of the detected RF signal is identified at block 906.

At block 908 it is determined, based at least in part on the discrete frequency band, if the ground-based RF emitter is known. In one example this accomplished with the controller 202 accessing the database 212 to see if the detected discrete frequency band is associated with a stored ground-based RF emitter that is within the area travel. In one example, if an association with a ground-based RF emitter is known, information regarding the ground-based RF emitter is gathered from database 212 at block 912. The location information may include the location of the ground-based RF emitter and, if on a cellular tower, the ground-based RF emitters elevation.

The Doppler shift of the received RF signals is monitored at block 914. At block 916 it is determined if the Doppler shift has reached zero. If the Doppler shift has not reached zero at block 916, the process continues monitoring the doppler shift at block 914. Once the Doppler shift reaches zero, the location information relating to the vehicle and ground-based RF emitter 104 is determined at block 918 as discussed above. If there is more than more than one RF signal from more than one ground-based RF emitter, as discussed above, more location information will be able to be determined regarding the location of vehicle 100. Further other systems such a GPS and INS may be used in determining location information.

If it was determined that the ground-based RF emitter 104 was not known, location information gathered regarding the detected ground-based RF emitter 104 may be stored in the ground-based RF emitter database 212. The information may include location information determined by the Doppler shift and/or location information determined from other navigation systems of the vehicle such as GPS and INS and the discrete frequency being used by the ground-based RF emitter database 212. Discovered ground-based RF emitter location information and associated discrete frequency may be distributed (or shared) at block 924 to a remote location. This information can then be gathered and distributed to subscribers that use a Doppler based cellular navigation system.

At block 920, the determined location by the Doppler based cellular navigation system 201 of vehicle 100 is then implemented. As discussed above, it may be used in navigation of vehicle 100 as a standalone system or it may be used to supplement another navigation system such as a GPS or INS. Example of supplement another navigation system is to help correct for drift in an INS and provide location information when enough GPS satellite signals are not being received at the GNSS receiver 208. The process continues at block 902 monitoring for RF signals.

As discussed in the above example embodiments, the doppler measurements are combined with data from the INS 206, in an example, to compute a navigation position. In an alternative implementation, an inverse may be performed where use of the data from the Doppler sensor is used to correct the navigation position produced by the INS 206. As noted above, inertial navigation systems are subject to drift errors that accumulate over time. The Doppler position measurements can be used to estimate and correct drift errors in INS 206. For example, many inertial navigation systems are implemented using Kalman filters to compute their position. The measurements from the Doppler based cellular navigation system can be used as an input to the position error estimates in the Kalman filter of the INS 206 and thereby correct for the inherent drift of the Doppler based cellular navigation system position solution. The fundamental methods for determining the Doppler position using the cellular RF signals would remain unchanged in this alternate example embodiment.

EXAMPLE EMBODIMENTS

Example 1 includes a Doppler based cellular navigation system. The system includes a radio frequency (RF) antenna, an RF receiver in communication with the RF antenna, a memory, and a controller. The memory includes a ground-based RF emitter database with ground-based RF emitter location information. The controller is in communication with the RF receiver and the memory. The controller is configured to monitor a Doppler shift in received RF signals from ground-based RF emitters. The controller is further configured to determine location information relating to the vehicle when the controller detects a Doppler shift in the received RF signal of zero. The controller is further is also configured to implement the determined location information in navigating a vehicle.

Example 2 includes the system of Example 1, wherein the controller is configured to determine the location information relating to the vehicle by identify a discrete frequency band associated with received RF signal and looking up location information of a ground-based RF emitter associated with the discrete frequency band in the ground-based RF emitter database.

Example 3 includes the system of any of the Examples 1-2, further including at least one other navigation system. The controller configured to supplement the location information from the at least one other navigation system with the determined location information from the Doppler based cellular navigation system.

Example 4 includes the system of Example 3, wherein the at least one other navigation system is a global navigation satellite system (GNSS) and the determined location information by the Doppler based cellular navigation system is used during non-satellite signal coverage periods.

Example 5 includes the system of Example 4, wherein the GNSS includes a GNSS receiver in communication with a GNSS antenna. The controller is in communication with the GNSS receiver.

Example 6 includes the system of Example 3, wherein the at least one other navigation system is an inertial navigation system (INS) and the determined location information by the Doppler based cellular navigation system is used to correct for drift in INS measurements.

Example 7, includes the system of any of the Examples 1-6, further including a communication system in communication with the controller. The controller configured to cause the communication system to communicate location information of detected ground-based RF emitters to a remote location.

Example 8 includes the system of Example 7, wherein the communicated location information includes at least a frequency of the RF signals generated by a detected ground-based RF emitter and a location of the detected ground-based RF emitter.

Example 9 includes the system of any of the Examples 1-8, further including a vehicle control system in communication with the controller. The vehicle control system is configured to control the navigation of the vehicle based at least in part on the determined location information when the controller detects a Doppler shift in the received RF signal of zero.

Example 10 includes a method of determining the location of a vehicle with a doppler based cellular navigation system. The method including identifying a ground-based radio frequency (RF) emitter in a travel path of vehicle using a ground-based radio RF emitter database; monitoring a Doppler shift in a received signal from the identified ground-based RF emitter as the vehicle continues in the travel path; determining a vehicle closest position to the ground-based RF emitter when the Doppler shift reaches zero; and determining the location of the vehicle based at least in part on the determined closest position to the ground-based RF emitter.

Example 11 includes the method of claim 10, further including increasing a determined location accuracy of the vehicle by measuring received signals from a plurality ground-based RF emitters.

Example 12 includes the method of any of the Examples 10-11, wherein the ground-based RF emitter is part of a cellular base station.

Examples 13 includes the method of any of the Examples 10-12, further including using an inertial navigation system to at least in part determine an inertial determined position of the vehicle.

Example 14 includes the method of Example 13, further including correcting for drift in the inertial navigation system based at least in part on the monitoring of the Doppler shift.

Example 15 includes the method of any of the Examples 10-14, wherein determining the location of the vehicle is done with at least one of determining a signal strength, determining a relative angle to the ground-based RF emitter, and using a rate of change of the Doppler shift.

Example 16 includes the method of any Examples 10-15 further including gathering ground-based RF emitter information with the vehicle as the vehicle traverses the travel path, the ground-based RF emitter information including at least frequency of the signal used by the ground-based RF emitter and location of the ground-based RF emitter; and using the gathered ground-based RF emitter information at least in part to generate the ground-based RF emitter database.

Example 17 includes the method of Example 16, further including, sharing the gathered ground-based RF emitter information; generating the ground-based RF emitter database based at least in part on the shared gathered ground-based RF emitter information at a remote location; and disseminating the ground-based RF emitter database to other vehicles.

Example 18 includes a method of determining a location of a vehicle with a Doppler based cellular navigation system, the method including, monitoring for radio frequency (RF) signals with an RF receiver; identifying a discreate frequency band used by a detected RF signal; identifying a ground-based RF emitter based on an identified discrete frequency band; obtaining ground-based RF emitter information regarding the identified ground-based RF emitter from a ground-based RF emitter database; monitoring Doppler shift in the detected RF signal; and determining location information of the vehicle at least in relation to the identified ground-based RF emitter based on at least the obtained ground-based RF emitter information and when the monitored Doppler shift reaches zero.

Example 19 includes a method of Example 18, further including supplementing at least one navigation system based on the determined location information.

Example 20 includes a method of any of the Examples 18-19, further including, increasing a determined location information accuracy of the vehicle by monitoring a Doppler shift in plurality of RF signals from a plurality of ground-based RF emitters.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A Doppler based cellular navigation system, the system comprising:

a radio frequency (RF) antenna;

an RF receiver in communication with the RF antenna;

a memory including ground-based RF emitter database with ground-based RF emitter location information; and a controller in communication with the RF receiver and the memory, the controller configured to monitor a Doppler shifts in received RF signals from ground-based RF emitters through the RF antenna, the controller further configured to determine both range and bearing to each ground-based RF emitter by measuring a rate of change of a doppler shift when the frequency of and associated received signal is equal to a known transmit frequency of the received RF signal, the controller further configured to determine location information using the determined range from at least two spaced ground-based RF emitters and determining an intersection of at least two circles and lines of position associated with the at least two spaced ground-based RF emitters, the controller further configured to implement the determined location information in navigating a vehicle.

2. The system of claim 1, wherein the controller is configured to determine the location information relating to the vehicle by identify a discrete frequency band associated with received RF signal and looking up location information of a ground-based RF emitter associated with the discrete frequency band in the ground-based RF emitter database.

3. The system of claim 1, further comprising:

at least one other navigation system, the controller configured to supplement the location information from the at least one other navigation system with the determined location information from the Doppler based cellular navigation system.

4. The system of claim 3, wherein the at least one other navigation system is a global navigation satellite system (GNSS) and the determined location information by the Doppler based cellular navigation system is used during non-satellite signal coverage periods.

5. The system of claim 4, wherein the GNSS comprises:

a GNSS receiver in communication with a GNSS antenna, the controller in communication with the GNSS receiver.

6. The system of claim 3, wherein the at least one other navigation system is an inertial navigation system (INS) and the determined location information by the Doppler based cellular navigation system is used to correct for drift in INS measurements.

7. The system of claim 1, further comprising:

a communication system in communication with the controller, the controller configured to cause the communication system to communicate location information of detected ground-based RF emitters to a remote location.

8. The system of claim 1, wherein the communicated location information includes at least a frequency of the RF signals generated by a detected ground-based RF emitter and a location of the detected ground-based RF emitter.

9. The system of claim 1, further comprising:

a vehicle control system in communication with the controller, the vehicle control system configured to control the navigation of the vehicle based at least in part on the determined location information when the controller detects a Doppler shift in the received RF signal of zero.

10. A method of determining a location of a vehicle with a Doppler based cellular navigation system, the method comprising:

identifying ground-based radio frequency (RF) emitters in a travel path of vehicle using a ground-based radio RF emitter database and RF signals transmitted by the RF emitters that are received through an RF antenna of the vehicle;

measuring a rate of change of a Doppler shift in the received signal RF signals from the identified ground-based RF emitters as the vehicle continues in the travel path to determine both range and bearing to each identified ground-based RF emitter;

determining a vehicle closest position to associated ground-based RF emitters when the Doppler shift reaches zero;

using the determined range to at least two spaced ground-based RF emitters of the identified ground-based RF emitters and an intersection of at least two circles and lines of position associated with the at least two spaced ground-based RF emitters to determine location information; and using the determined location information at least in part for the navigation of the vehicle.

11. The method of claim 10, further comprising:

increasing a determined location accuracy of the vehicle by measuring the received RF signals from more than two ground-based RF emitters.

12. The method of claim 10, wherein the ground-based RF emitter is part of a cellular base station.

13. The method of claim 10, further comprising:

using an inertial navigation system to at least in part determine an inertial determined position of the vehicle.

14. The method of claim 13, further comprising:

correcting for drift in the inertial navigation system based at least in part on the monitoring of the Doppler shift.

15. The method of claim 10, wherein determining the location of the vehicle is done with at least one of determining a signal strength, determining a relative angle to the ground-based RF emitter, and using a rate of change of the Doppler shift.

16. The method of claim 10, further comprising:

gathering ground-based RF emitter information with the vehicle as the vehicle traverses the travel path when the received signal is not associated with a ground-based RF emitter already in the ground-based radio RF emitter database, the ground-based RF emitter information including at least frequency of the RF signal used by the ground-based RF emitter and location of the ground-based RF emitter; and using the gathered ground-based RF emitter information at least in part to generate the ground-based RF emitter database.

17. The method of claim 16, further comprising:

sharing the gathered ground-based RF emitter information;

generating the ground-based RF emitter database based at least in part on the shared gathered ground-based RF emitter information at a remote location; and disseminating the ground-based RF emitter database to other vehicles.

18. A method of determining a location of a vehicle with a Doppler based cellular navigation system, the method comprising:

monitoring radio frequency (RF) signals with an RF receiver that are received by an RF antenna of the vehicle;

identifying a discreate frequency band used by a each detected RF signal;

identifying each ground-based RF emitter based on an identified discrete frequency band;

obtaining ground-based RF emitter information regarding identified ground-based RF emitters from a ground-based RF emitter database;

measuring the rate change of a detected Doppler frequency shift in the detected RF signals;

determining location information of the vehicle at least in relation to at least two identified ground-based RF emitters based on at least the obtained ground-based RF emitter information and when the monitored frequency of the received signal is equal to a known transmit frequency of a ground-based RF emitter; and using the determined location at least in part for the navigation of the vehicle.

19. The method of claim 18, further comprising:

supplementing at least one navigation system based on the determined location information.

20. The method of claim 18, further comprising:

increasing a determined location information accuracy of the vehicle by monitoring a Doppler shift in plurality of RF signals from more than two ground-based RF emitters.

* * * * *